Oct. 28, 1958 R. H. BABCOCK 2,858,024
LIQUID FILTER BACKWASH CONDITION MEASUREMENT
Filed Jan. 20, 1955 5 Sheets-Sheet 1
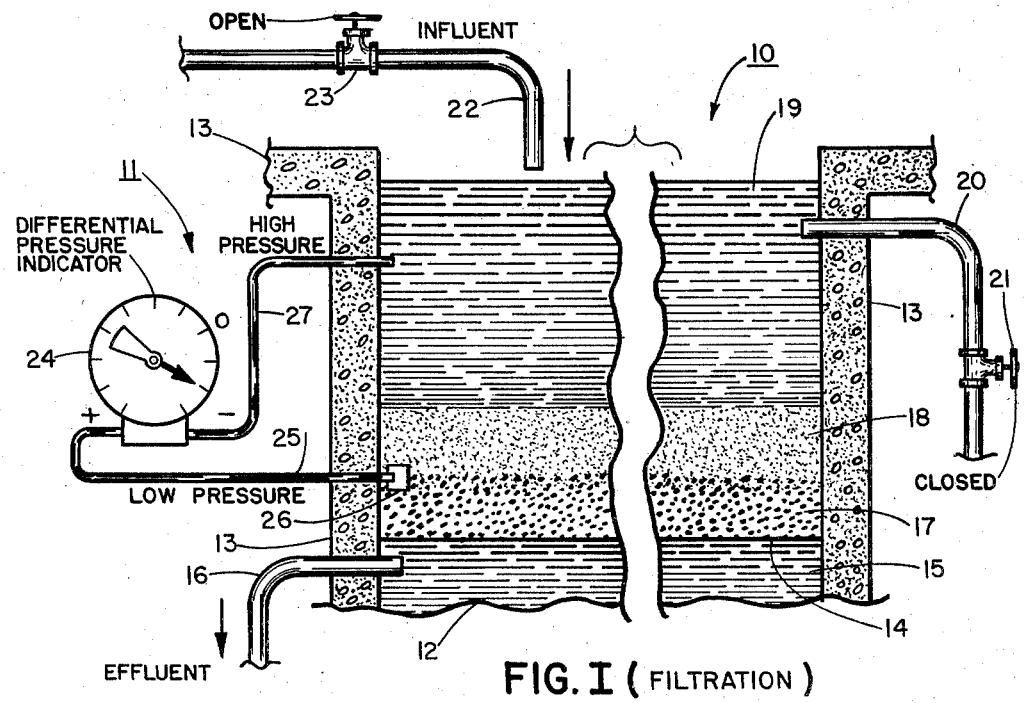
FIG. I (FILTRATION)
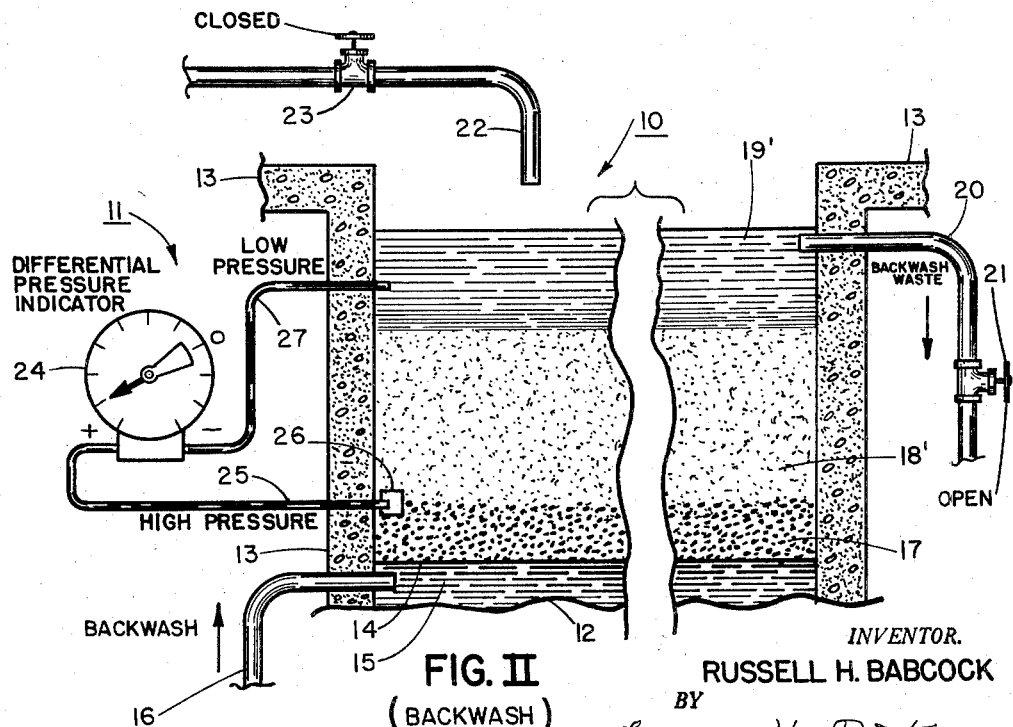
FIG. II (BACKWASH)
INVENTOR.
RUSSELL H. BABCOCK
BY
Lawrence H. Paston
AGENT

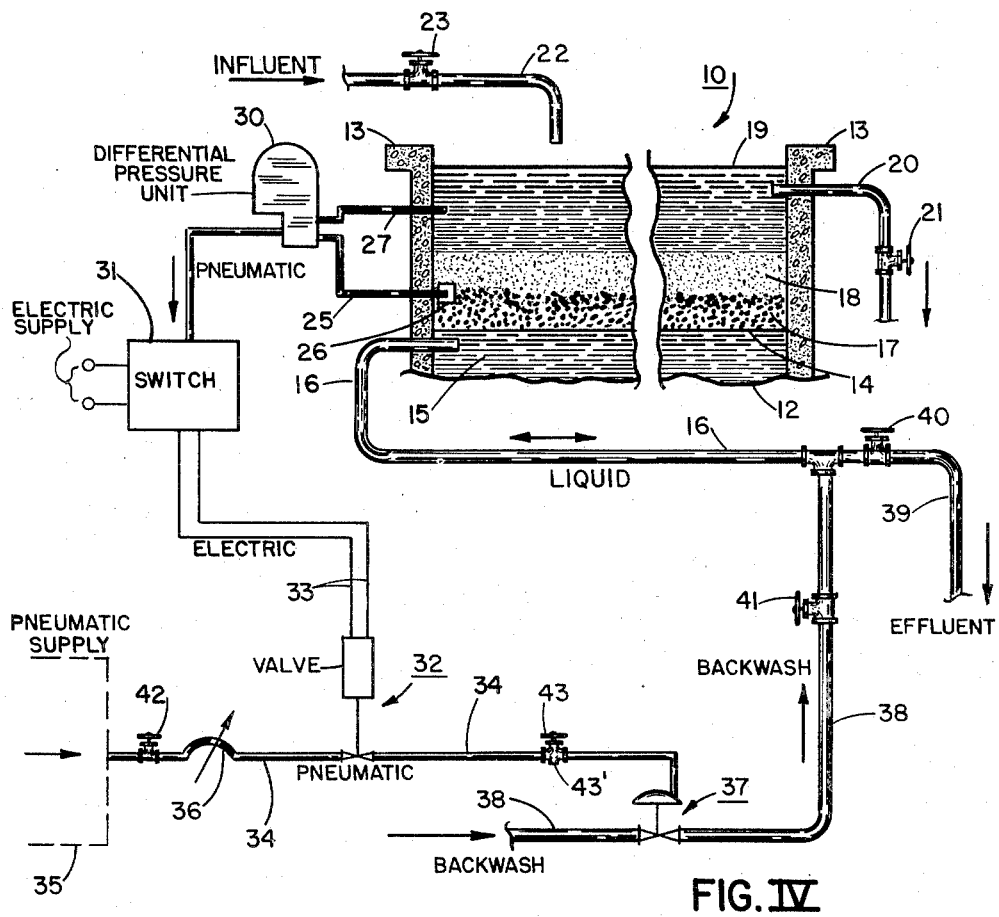
FIG. IV
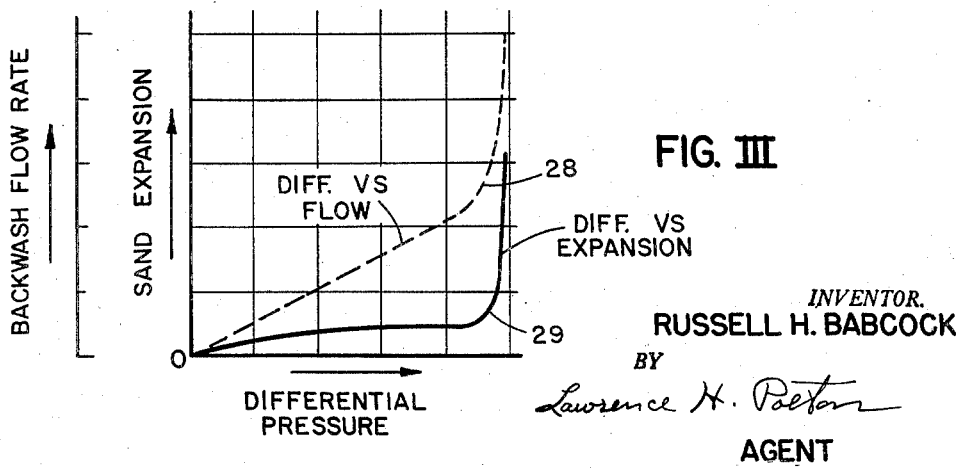
FIG. III
INVENTOR.
RUSSELL H. BABCOCK
BY
Lawrence H. Poston
AGENT

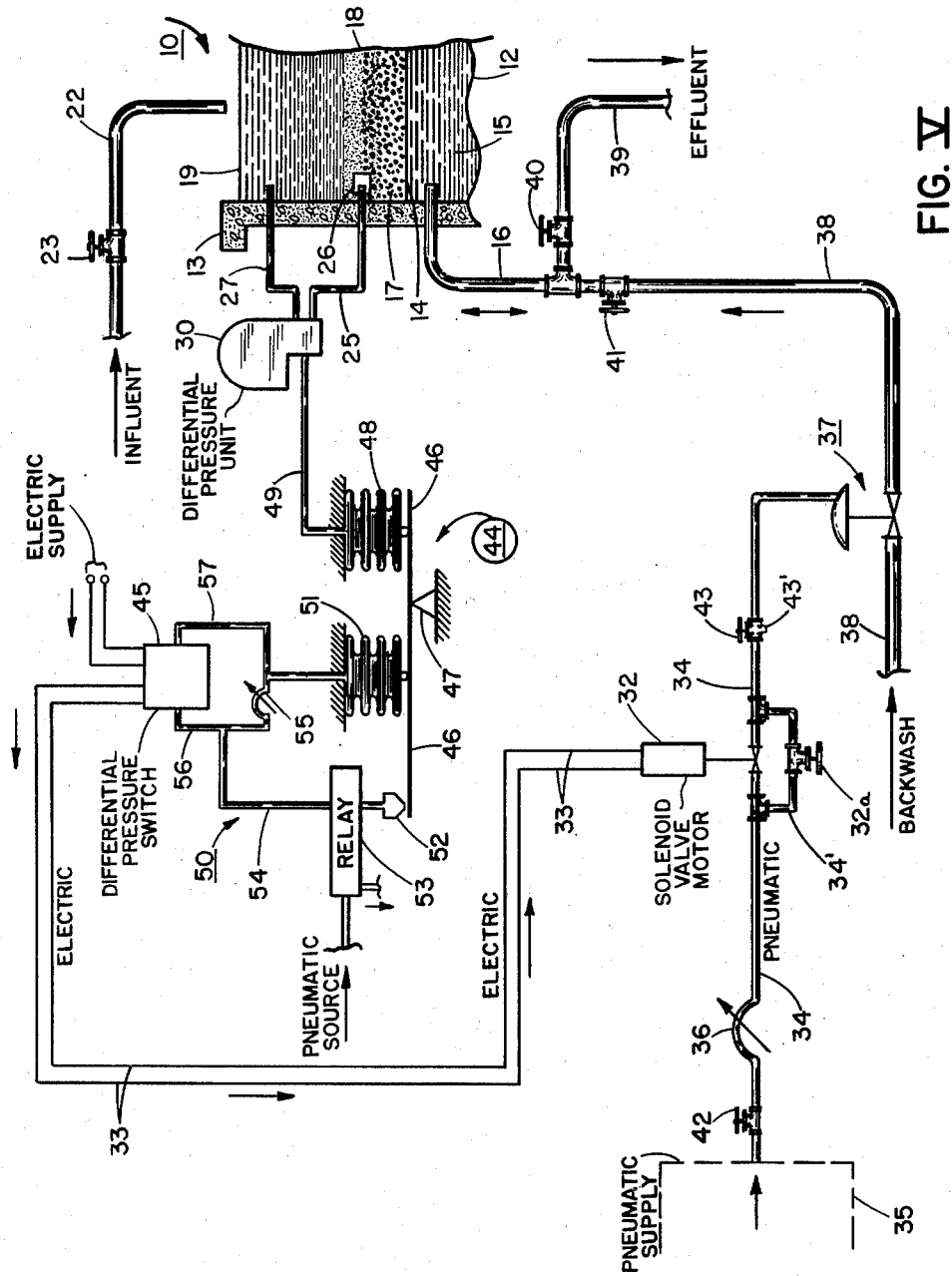

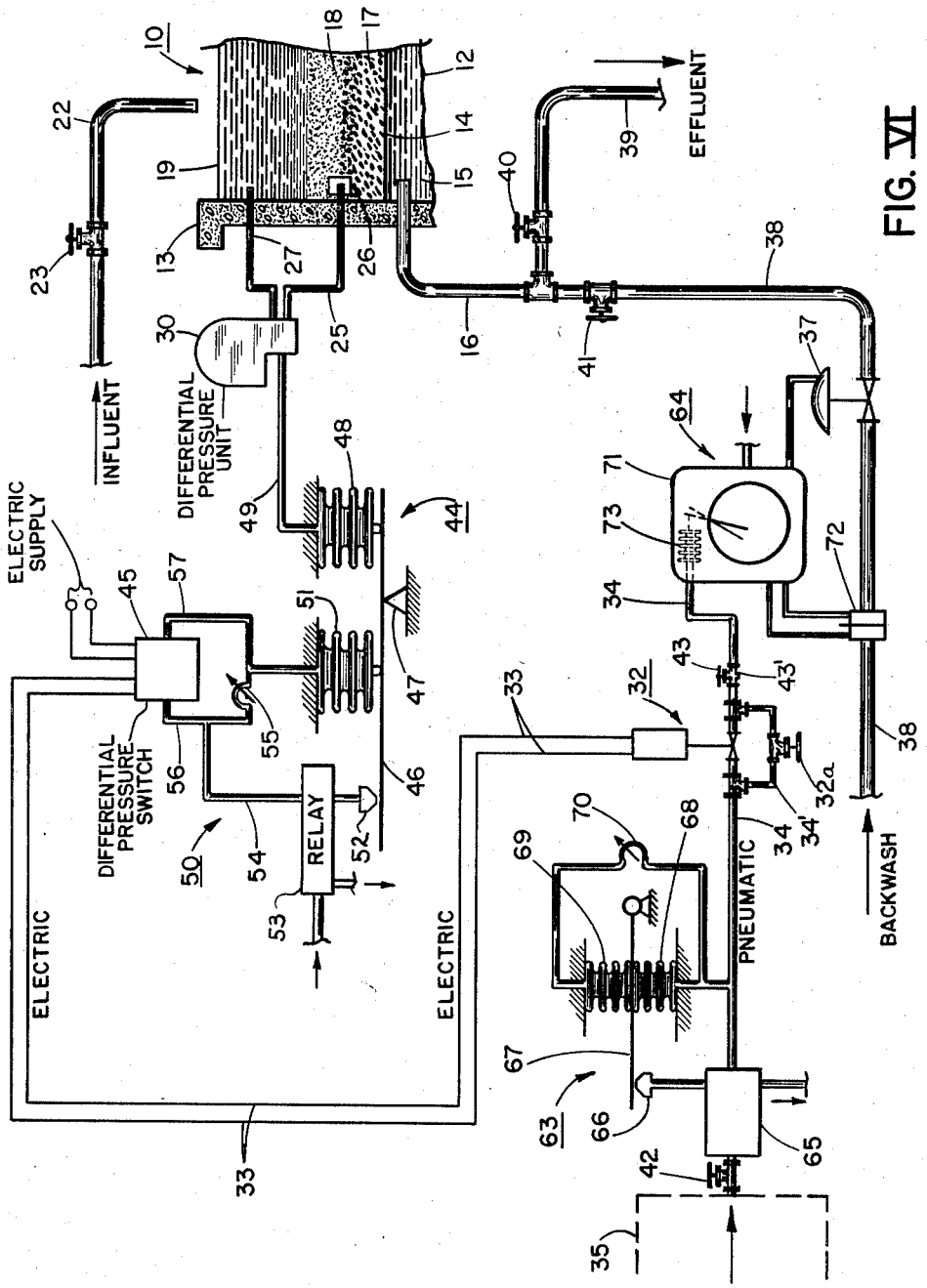

Oct. 28, 1958   R. H. BABCOCK   2,858,024
LIQUID FILTER BACKWASH CONDITION MEASUREMENT
Filed Jan. 20, 1955   5 Sheets-Sheet 5
FIG. VII
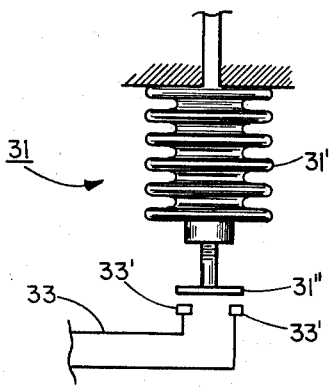
FIG. VIII
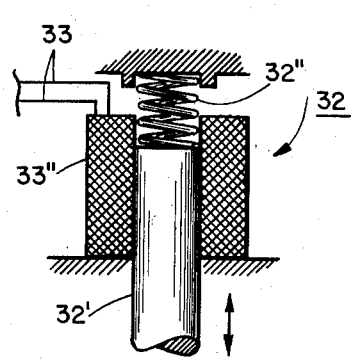
FIG. IX
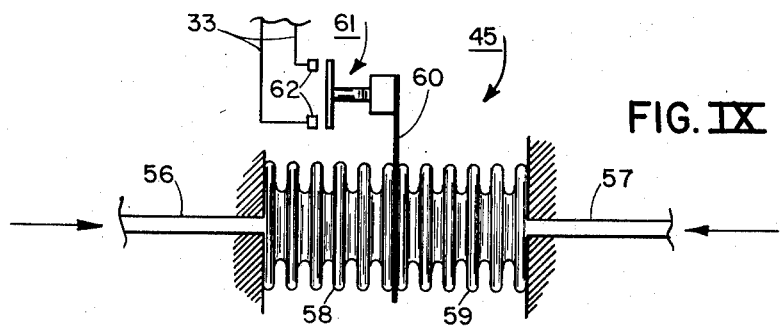
FIG. X
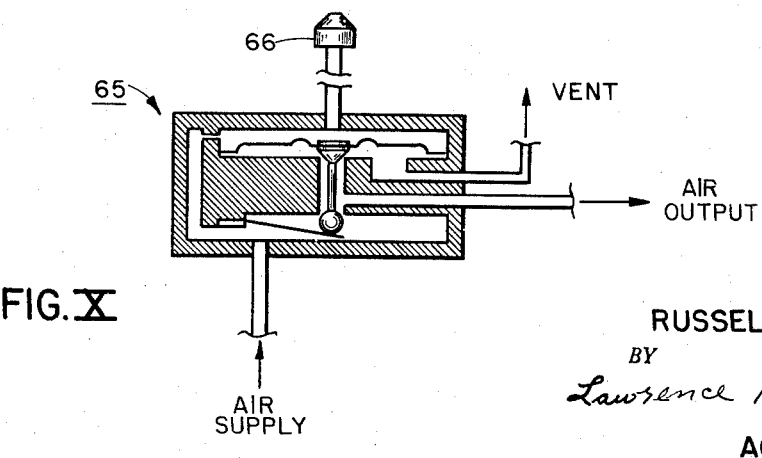
INVENTOR.
RUSSELL H. BABCOCK
BY
Lawrence H. Porter
AGENT United States Patent Office 2,858,024
Patented Oct. 28, 1958

2,858,024

LIQUID FILTER BACKWASH CONDITION MEASUREMENT

Russell H. Babcock, Sharon, Mass., assignor to The Foxboro Company, Foxboro, Mass., a corporation of Massachusetts Application January 20, 1955, Serial No. 483,098

1 Claim. (Cl. 210—108)

This invention relates to fluid filter units having filter beds made up of discrete particles, such as sand particles, for the purification of influents in the form of various liquid mixtures and suspensions such as sewage, industrial waste, and raw water. It has particular reference to means for backwashing the filter beds of such filter units.

Filter units with which this invention is concerned are those which are provided with backwash cleaning systems rather than the older type of filter units which had to be cleaned by scraping or rebuilding. One form of such backwashed filter units is sometimes called a rapid sand filter. This is a sand bed filter with a backwash arrangement for the sand bed.

The backwashing action in such filter units essentially reverses the filtration process and floats off the impurities thus removed from the filter bed.

In the course of such backwashing action, the backwash liquid (ordinarily water) is forced through the filter bed to lift and roil the filter bed particles until the particles are essentially in suspension and the impurities are floating. Difficulties are met when attempts are made to suspend the filter bed particles without floating them away or "boiling" them off. When the backwash force is sufficient to put the particles of the filter bed in suspension, the filter bed expands, and for practical purposes there is no longer any barrier to an increase in backwash flow. Accordingly, it has been difficult to control the backwash so as not to "boil" off the filter bed particles under these conditions. If the filter bed particles are washed away or the filter broken up, the bed must be re-laid, with attendant substantial expense and delay which may be aggravated by plugged piping due to filter bed particle deposits therein.

The present invention overcomes such prior art difficulties by providing means for measuring filter bed backwash conditions which make it possible and practical to thoroughly clean such filter beds quickly and efficiently, without substantial filter bed particle loss or filter bed disruption, and with substantial savings in equipment and power in comparison with prior art practices, due in large part to reduced flows and increased efficiency made possible by this invention.

The backwash condition of the filter bed with which this invention concerned is the point at which the filter bed particles become suspended by the backwash. At this point the filter bed is expanded. By increasing the backwash flow until this point of suspension is reached and by thereafter holding the backwash flow constant for a time, the filter bed is cleaned without "boiling" off the filter bed particles and without rupturing the filter bed. This invention provides differential pressure means for determining the backwash point of filter bed particle suspension, or a point in predetermined relation therewith. Thus the backwash flow increase can be terminated in time to prevent loss of filter bed particles and at a flow value best conducive to further filter bed backwashing.

As will be seen hereinafter the backwash differential pressure essentially stops changing at the point of backwash filter bed particle suspension, so this point is determinable by differential pressure measuring means.

It is therefore, an object of this invention to provide new and improved means for measuring backwash condition in a filter bed.

It is a further object to provide a differential pressure for measuring backwash condition in a filter bed.

Other objects and advantages of this invention will be in part apparent and in part pointed out hereinafter, and in the accompanying drawings, wherein:

Figure I is a showing of a rapid sand filter during filtration;

Figure II is a showing of the rapid sand filter of Figure I during backwashing, with a differential pressure system associated therewith for measuring backwash condition in the bed of the filter;

Figure III is a graph illustrating the relations between backwash flow, filter bed expansion, and differential pressure in a system as illustrated in Figure II;

Figure IV is a schematic showing of a backwash control system associated with the filter arrangement of Figure II;

Figure V is a schematic showing of the system of Figure IV with a differential pressure change sensing system associated therewith;

Figure VI is a schematic showing of the system of Figure V with a special backwash flow control system associated therewith; and Figures VII–X are illustrations of various conventional devices shown in blocks in Figures IV, V, and VI.

As an illustrative embodiment of this invention, a rapid sand filter unit is shown and described herein, together with means for measuring and controlling the backwash condition thereof.

Figure I shows a rapid sand filter 10 during filtration, with a differential pressure system 11 associated therewith. The filter unit rests on earth 12, and is provided with cement walls 13. A screen 14 is provided across the filter unit a sufficient distance above the earth 12 to form a drain-off lower chamber 15. This is an effluent drain-off chamber for filtration (Figure I) and an entry chamber for backwash (Figure II). A pipe 16 extends into the chamber 15, from a combination drain-off and backwash piping arrangement of the general character shown in Figures IV, V, and VI.

Again in Figure I, a layer 17 of gravel overlies the screen 14 and a layer 18 of sand overlies the gravel. The filter bed formed by the sand 18 is settled and unexpanded in this filtration condition. Above the sand is a body influent 19 which is about to be filtered. Near the top of the wall 13, a top drain-off pipe 20 leads outward from the filter as a means of draining off backwash waste, i. e., impurities which are dislodged and floated away from the filter bed during filtration. This top drain-off pipe 20 is provided with a valve 21 which is kept closed during filtration (Figure I). The influent which is to be filtered, is directed to the top of the filter unit through a top supply pipe 22. During backwashing the supply pipe 22 is closed off by a valve 23 therein.

The differential pressure system 11 comprises an indicator unit 24 with a conventional diaphragm or double bellows arrangement (not shown) therein. One take-off pipe 25 has its open end in the filter unit at the interface between the gravel layer 17 and the sand layer 18. A screen 26 is provided at this end of the pipe 25 to admit liquid and to keep out sand. The other take-off pipe 27 has its open end in the filter unit and in the body of influent 19, but below the level of the top drain-off pipe 20. In this manner static pressures are cancelled out and produce no differential indication. This is a desirable arrangement, since static "heads" or pressures have little, if any, usable relation to the backwash condition of the filter bed. During filtration (Figure I), the differential pressure registers negative with respect to the backwash. That is, the differential pressure take-off 27 is the high pressure and the differential pressure take-off 25 is the low pressure side.

On the other hand, with reference to the backwashing arrangement of Figure II, the differential pressure take-off 27 is the low pressure side and the differential pressure take-off 25 is the high pressure side. In the Figure II arrangement, the influent valve 23 is closed, and the top drain-off valve 21 is open. The pipe 16 in this instance is used to introduce backwash liquid into the filter chamber 15. Figure II shows the filter bed formed by the sand 18 to be substantially expanded, with the sand particles in suspension in the backwash. The level of the liquid 19' above the sand 18 is down to about the level of the top drain-off pipe 20. The gravel 17 is too heavy to be substantially disturbed by the backwash, and remains essentially in the same condition as during filtration, except that the backwash removes floatable impurities, and sand therefrom.

The backwashing action is carried out by applying an increasing liquid pressure to the under side of the filter bed, starting from zero pressure. The initial backwash differential is zero, then it becomes small and positive, that is: high at the lower take-off 25 and low at the upper take-off 27. As the backwash pressure increases, the backwash differential pressure increases.

The backwash differential pressure results from the backwash pressure drop across a "resistance," i. e., the weight of the sand in the backwash liquid. The backwash differential pressure increases initially during backwashing because of the increasing backwash pressure as applied to the filter bed "resistance." Once the weight of the sand has been overcome by the increasing backwash pressure, the "resistance" thereof has essentially no effect with respect to substantial further increases of backwash differential pressure, and the backwash differential pressure stops increasing and remains essentially at the value it had achieved at the "point" of attainment of sand suspension. The backwash differential pressure increase is tempered by certain flow increasing factors relative to the condition of flow resistance in the filter bed. One factor which produces increased flow is the increased pressure alone. Another factor is decreased resistance due to the removal of some of the impurities from the filter bed while the backwash pressure is increasing. A third factor is the decreased resistance due to the increasing support of the sand particles by the increasing backwash pressure as it tends to lift the sand particles. These factors are negligible, however. The backwash flow is preferably increased at the greatest possible rate short of disrupting the filter bed. Thus the backwash differential pressure increases until the point of attainment of sand suspension. The graphic curves of Figure III illustrate this action. When the filter bed is expanded by the backwash so that the sand particles are suspended therein there is effectively no resistance to increases in backwash pressure and the consequent backwash flow throughout a substantial range of such increases.

Figure III illustrates that the differential pressure essentially stops changing when the filter bed expansion reaches a particular point, i. e. the point of particle suspension by the backwash. The "point" of filter particle suspension is intended to mean that portion of the curves wherein a sharp turn is taken, as at 28 and 29. Thus the suspension "point" may be arbitrarily chosen on the sharp turns 28 and 29 of the Figure III curves, just before these turns or even beyond them. The nature of the impurities to be removed may have a bearing on the selection of the suspension "point." The critical factor is the prevention of filter bed particle "boiling" off or filter bed disruption, and the suspension "point" therefore is chosen in the light of all the circumstances of a particular application. The backwash pressure increase termination point is similarly chosen, and may or may not coincide with the suspension "point" although it always must have a predetermined relation thereto. The desired procedure is to increase the backwash pressure until the filter bed particles are suspended, and then to stop the increase of the backwash pressure and to maintain it at that value for a period sufficient to substantially clear the filter bed of floatable impurities. Therefore it may be desirable to stop the backwash flow increase just prior to, or just after, the "point" of filter bed particles suspension.

Thus the purpose of this invention is to bring backwash pressure up to a predetermined point and to hold it at that point as the best condition for "washing" the filter bed. This invention provides means for measuring the backwash condition of the filter bed in terms of differential pressure wherein a predetermined differential pressure or condition of change of differential pressure is related to the "point" of attainment of backwash filter bed particle suspension.

In the Figure II arrangement, a predetermined, indicated differential pressure is the signal for the backwash pressure increase to be stopped. This can be done manually by an operator through suitable valving arrangements or automatically by a control system such as that illustrated in Figure IV.

In Figure IV the filter unit of Figures I and II is shown with the filter bed of sand 18 as yet undisturbed by backwashing. In this arrangement a differential pressure transmitter unit 30 is used instead of the indicator 24 of Figures I and II. The differential pressure unit 30 is of the type described in the Patent 2,539,892, issued January 30, 1951, to L. Cook. The pneumatic output of the differential unit 30 is applied to a pneumatically operated electrical switch 31, which is schematically shown in Figure VII. In the switch 31 a bellows 31' is provided, to which differential pressure is applied from the measuring unit 30. A contact plate 31" is adjustably mounted on the movable end of the bellows 31'. Further, contacts 33' are arranged to be closed by the contact plate 31" when the differential pressure reaches a predetermined value. When the switch 31 is thus closed, a solenoid valve 32 partially detailed in Figure VIII is energized through electrical connections 33 between the switch 31 and the solenoid valve 32. The solenoid valve 32, as in Figure VIII, comprises an electrical coil 33" with the valve stem 32' movable therein, and a valve loading spring 32".

The valve 32 is arranged in a pneumatic supply pipe line 34 as an on-off control valve therefor. The pipe line 34 connects a pneumatic supply source 35, through a variable pneumatic restrictor 36, to a pneumatic valve 37. The valve 37 is established in a backwash supply pipe line 38 as a valve which operates in response to the pressure from the pneumatic source 35 to control the backwash flow through the pipe line 38. The pipe line 38 is connected to the filter unit pipe 16 as a means of supplying backwash pressure to the under side of the filter unit 10, i. e. to the filter bottom chamber 15. An effluent drain-off pipe 39 is branched from the filter unit pipe 16 and manual valves 40 and 41 are provided as means for shutting off the drain-off or the backwash, according to whether the device is undergoing filtration or being backwashed. The pneumatic supply pipe 34 is also provided with manual valves, 42 and 43, for shutting down and bleeding off, respectively, the supply through the pipe 34. The valve 43 is provided with an opening 43' to atmosphere.

The backwashing operation may be manually initiated by closing the influent and effluent valves 23 and 40, by opening the top drain-off valve 21 and the backwash supply valve 41, and by opening the backwash control pneumatic supply valve 42. The pneumatically operated backwash valve 37 is normally closed, i. e., it is arranged as an air-to-open valve. Also, the solenoid valve 32 is normally open and the bleed off valve 43 is normally an open connection to the valve 37, without bleed-off.

Accordingly, in the Figure IV system, when the backwashing is thus initiated, a small, increasing pneumatic pressure is applied to the backwash valve 37. The nature of this pressure increase is the result of the effect of the pneumatic supply restrictor 36 in the pneumatic supply pressure. As the pressure drop across this restrictor 36 decreases, the control pressure increases, as applied to the valve 37. Consequently, the backwash pressure in the filter unit bottom chamber 15 starts at zero and increases in relation to the pressure drop decrease across the pneumatic supply restrictor 36. The backwash differential pressure, as established in the differential pressure unit 30, increases as the backwash pressure increases. When the backwash differential pressure reaches a predetermined value, in relation to the point of achievement of sand suspension, as established by the particular conditions of the specific filter installation in relation to graphic curves of the type shown in Figure III, the electric switch 31 is actuated thereby. As a result, the solenoid valve 32 is energized and closed. This action terminates the increase of pneumatic pressure to the backwash valve 37. The then existing pressure is locked in the pneumatic supply pipe 34 downstream with respect to the solenoid valve 32, and the backwash valve 37 is held open to a degree determined by this locked in pressure. Thus the backwash pressure is automatically brought up to, and held at, a value which provides an efficient, filter cleaning backwash flow. The system is left in this condition for whatever period of time is necessary to produce the desired cleaning of the filter bed. This time period is determinable by observation or by approximation with regard to the filter size, the nature of the influent, etc. After this cleaning period, the backwashing system is manually shut down by closing the supply valve 42 to cut off the backwash supply pressure, by adjusting the bleed valve 43 to drain the operating pressure from the backwash control valve 37, and by closing the top drain-off valve 21. Thereafter, the filtration process is restarted by opening the influent valve 23 and the effluent valve 40. Such start-ups and shut-downs may be readily made automatic or at least operable by pushing a single button, by using conventional multiple valve operating systems.

The Figure V system is substantially the same as that of Figure IV, including the top drain-off pipe 20 which is not shown in Figure V, except that the Figure IV pressure switch 31 is replaced by a differential pressure change sensing pneumatic system 44. With reference to Figure III, when the backwash pressure becomes great enough to expand the sand filter bed and to suspend the sand particles, the backwash differential pressure stops increasing. The Figure V pneumatic system 44 comes to a balance essentially when the differential pressure stops changing. At the point of such balance, a differential pressure electrical switch 45 is closed, and the solenoid valve 32 is energized to stop the backwash pressure increase, as described in connection with the Figure IV system. The differential pressure switch 45 is shown in some detail in Figure IX.

The Figure V pneumatic system 44 comprises a balance arm 46 for movement about a fulcrum 47, a bellows 48 for receiving the differential pressure from the differential pressure unit 30 through a pipe 49 and for applying a force representative of the differential pressure to the balance arm 46 at one side of the fulcrum 47, and a secondary pneumatic system 50 which includes a bellows 51 mounted in operative opposition to the bellows 48, with respect to the balance arm 46 and its fulcrum 47. The secondary pneumatic system 50 further includes a pneumatic nozzle 52 in nozzle-baffle relation with the balance arm 46, a conventional supply and waste pneumatic relay 53 as detailed in Figure X and associated with the nozzle 52 in the conventional pneumatic nozzle-baffle manner, a pneumatic connection 54 from the output, relay 53, to the bellows 51 through a variable restrictor 55 in a proportional feed-back arrangement as a means for balancing the effects of the two bellows 48, 51.

The restrictor 55 is by-passed by an arrangement comprising two pneumatic pipe connections 56 and 57 with the differential pressure switch 45 (Figure IX) therebetween.

As in Figure IX, the differential pressure switch 45 comprises a pair of opposed bellows 58 and 59 as terminals respectively, of the Figure V pipe connections 56 and 57. A dividing wall 60 is provided between the bellows 58 and 59 for movement representative of the pressure differential between the bellows. The wall 60 is extended laterally of the bellows and an adjustable electrical contact assemby 61 is mounted on one side of this lateral extension for closing engagement with a pair of electrical contacts 62 as a means of completing an electrical circuit through the leads 33 to energize the Figure V solenoid valve 32.

Thus when the backwash differential pressure essentially stops changing, the pneumatic system 44 achieves a point of balance, with essentially a zero pressure drop across the restrictor 55. Under these conditions the pressure differential between the Figure IX bellows 58, 59 is essentially zero, and the contact assembly 61 is arranged and adjusted to close the contacts 62 at this point. Accordingly, the Figure V system is sensitive to the filter bed pressure differential when it essentially stops changing, as at the Figure III curve areas 28 and 29.

The Figure VI system is substantially the same as that of Figure V, except that different control means is provided for the backwash control pneumatic supply in the pipe 34, and for the backwash directly, in the pipe 38. The first of these means is a variable restrictor system 63 for providing an essentially linearly increasing backwash control pneumatic supply, and the second of these means is a direct flow control system 64.

The purpose of the Figure VI restrictor system 63 is to make the pneumatic supply essentially linear as it increases. Thus the backwash can be increased at a steady rate rather than at an increasing rate which might give too much pressure to the filter bed too quickly, with danger of disruption of the filter bed.

The restrictor system 63 comprises a variable restrictor pneumatic relay 65. A conventional form of such a supply and waste relay is shown in Figure X. In this relay the pneumatic supply is variably controlled in accordance with nozzle (66) back pressure, as occasioned by the pivoted movement of a baffle, Figure VI item 67, toward and away from the nozzle 66. This baffle movement is produced by the output of the relay 65 as applied through a conventional pneumatic proportioning system comprising a pair of opposed bellows 68, 69, with the baffle 67 therebetween. The output of the relay 65 is applied directly to the bellows 68, and indirectly to the bellows 69 through a pneumatic restrictor 70. To achieve full linearity it may be necessary to conventionally apply spring loading to the bellows 68, 69 combination.

As an aid in starting up the pneumatic supply system of Figures V and VI, a by-pass pipe 34' is provided around the valve 32, with a manual valve 32a therein.

The purpose of the flow control system 64 is to hold the backwash to the set point value called for by the pneumatic supply pressure, as a means for more closely controlling the backwash in a plan of predetermined increase.

The system 64 comprises a flow control instrument 71 of the character disclosed in Patent 2,631,570 issued to H. L. Bowditch on March 17, 1953. The control instrument 71 uses an orifice plate flow sensing arrangement 72, and the output of this instrument controls the backwash valve 37. The set point of the instrument 71 is controlled by the pneumatic supply through the pipe 34 as applied to a bellows 73 within the instrument 71. This set point is therefore increasing during the backwashing.

This invention accordingly provides new and improved means of measuring backwash condition in a filter bed.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in limiting sense.

I claim:

An open type sand bed filter system wherein a backwash arrangement is provided to gradually lift the filter bed on an increasing backwash flow basis to the point of full suspension of said bed as characterized by essential cessation of differential pressure increase through said bed and wherein said backwash increase cessation is sensed and used to terminate the increase of said backwash flow, said backwash flow thereafter continuing at the rate achieved at the time of said termination, said system comprising, in combination, a filter bed, an influent pipe for discharge onto said bed, an effluent pipe for drainage from beneath said bed, an overflow pipe for drainage from above said bed, a backwash system for applying wash liquid to the under side of said bed, valving arrangements for adjusting said filter system from filter condition to backwash condition and the reverse, a pre-set pneumatic program system for controlling backwash flow into said bed through said backwash pipe, and an automatic control system actuated by said full suspension condition of said bed for terminating the program of said program system, said backwash system comprising a backwash pipe through which backwash liquid may be applied to the under side of said filter bed, and a valving unit in said backwash pipe, with said valving unit variable on a gradual basis to provide increasing backwash flow to said filter bed, said pneumatic program system comprising a pneumatic pipe leading to said backwash valving unit to provide increasing pneumatic pressure thereto on a pre-set programmed basis, an operationally fixed pneumatic restrictor in said pneumatic pipe, and a substantial pressure pneumatic supply applied to said backwash valving unit through said pneumatic pipe and said pneumatic restrictor, whereby the pneumatic pressure drop across said restrictor is in a decreasing condition to provide an increasing pneumatic pressure at said backwash valving unit with consequent increasing backwash flow, and said automatic control system comprising, in combination, a pneumatic differential pressure sensing system vertically across at least a portion of said filter bed, a pneumatic-electric on-off switch responsive to cessation of change in differential pressure in said sensing system, and an electro-mechanical valve located in said pneumatic pipe between said pneumatic restrictor and said backwash valving unit and responsive on an on-off basis to the action of said switch to fully open or fully close said pneumatic pipe, whereby when thus closed, said pneumatic pipe between said electro-mechanical valve and said backwash valving unit is a closed and locked-up pneumatic system which holds said backwash valve fixed in partially open condition and consequently terminates said backwash flow increase and holds said backwash flow at a steady rate.

References Cited in the file of this patent

UNITED STATES PATENTS

| | | |
|---|---|---|
| 1,892,951 | Hughes | Jan. 3, 1933 |
| 2,366,903 | Harms | Jan. 9, 1945 |
| 2,376,912 | Green | May 29, 1945 |
| 2,535,569 | Toensfeldt | Dec. 26, 1950 |
| 2,606,863 | Rehbein | Aug. 12, 1952 |
| 2,614,424 | Thoresen | Oct. 21, 1952 |
| 2,632,566 | Morrison | Mar. 24, 1953 |